F. S. CAMPBELL.
PSYCHOGRAPH.
APPLICATION FILED JAN. 12, 1921.

1,404,927.   Patented Jan. 31, 1922.

Inventor:
Fred S. Campbell.
by Emery, Booth, Janney & Varney.
Attys.

UNITED STATES PATENT OFFICE.

FRED S. CAMPBELL, OF LYNN, MASSACHUSETTS.

PSYCHOGRAPH.

1,404,927.

Specification of Letters Patent.  Patented Jan. 31, 1922.

Application filed January 12, 1921. Serial No. 436,788.

*To all whom it may concern:*

Be it known that I, FRED S. CAMPBELL, a citizen of the United States, and a resident of Lynn, in the county of Essex and State of Massachusetts, have invented an Improvement in Psychographs, of which the following description, in connection with the accompanying drawings, is a specification, like characters on the drawings representing like parts.

This invention relates to devices of that class wherein a member moves under the hands of one or more persons without voluntary control by such persons of its movement. As the movements are sometimes ascribed to supernatural agencies, such devices have been given the name psychographs. As regards the present device I advance no explanation as to the cause of these movements and the device may be considered as an apparatus of psychical research or as a parlor game. The fact is, however, that the mechanism will operate as hereinafter described giving signals which may be interpreted as desired.

My invention will best be understood by reference to the following description of the illustrative embodiment thereof shown by way of example in the accompanying drawings, wherein.

Figure 1:
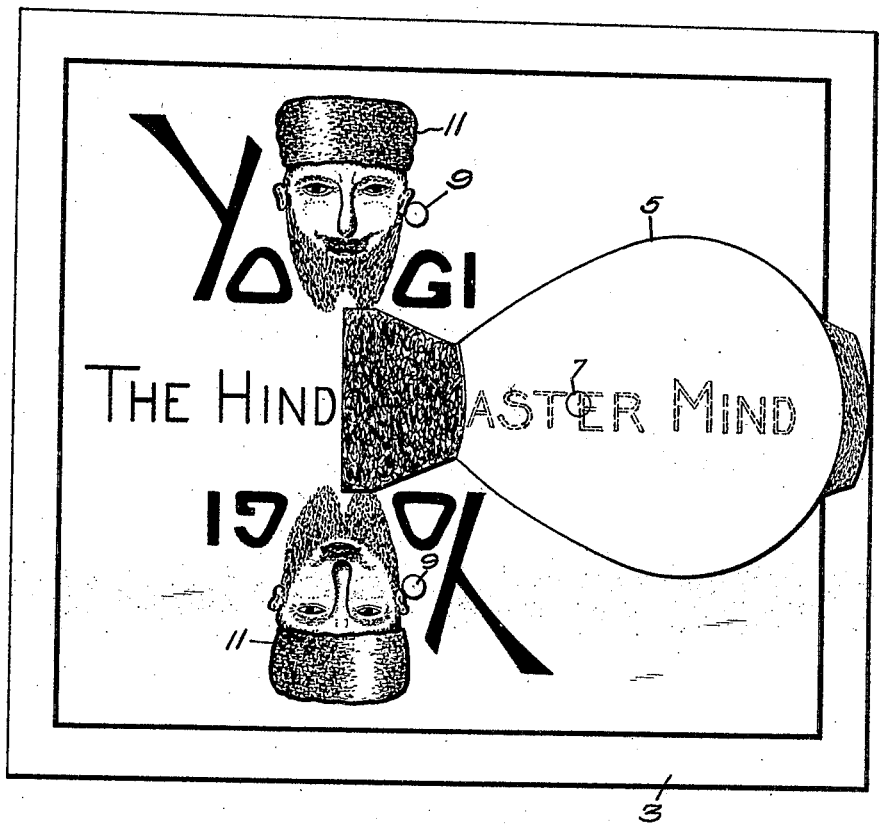
Fig. 1 is a plan view of the apparatus.
Figure 2:
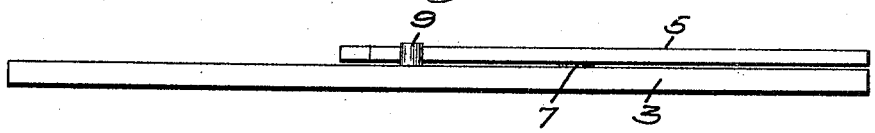
Fig. 2 is a side elevation.

Referring to the drawings the apparatus here shown comprises a suitable base 3 on which is mounted the planchette 5 on which the hand of the user may rest and which is adapted for involuntary movement under the hand. The planchette 5 may be given if desired a suitable fanciful form and herein I have shown it in the form of an incense burner or censer having a cloud of smoke issuing from the mouth thereof. The planchette 5 as best shown in Fig. 2 may be swivelled on the base by a bearing 7 permitting it to swing freely thereon but in the present instance this movement is limited and means are provided for giving a suitable audible signal at certain positions of the planchette. For example the planchette 5 may oscillate in a comparatively short arc between the fixed posts 9 arising from the base and is adapted to strike thereagainst with a rap as it swings. These raps may be interpreted in desired manner. For example certain numbers of raps may be interpreted as "yes," "no" and other simple answers to questions. For other messages the alphabet may be recited and words spelt out by the indication of the planchette giving an audible signal as a letter is arrived at. This method or code of communication is well known and commonly understood.

In operating devices of this character an utmost seriousness of demeanor in the user is essential. To facilitate this, suitable means may be provided on the base for fixing the attention and preventing any conscious control of the movement of the planchette under the hands. Conveniently this attention-fixing means includes a representation of the human eye, the hypnotic powers of which are well understood, and I have herein shown on the base the human heads 11 which may suitably represent a yogi or mystic, the object being to attain a proper suggestive atmosphere.

In the construction as shown the planchette has a simple rhythmic movement and, oscillating in a limited path, prevents waste of time and erratic or futile movements. The attention being fixed by the representations 11 on the base of the board, the planchette under the hand will soon start into a regular rhythmic sway independently of any voluntary muscular control by the user and in the course of this swaying movement will from time to time strike one or the other of the posts, giving an audible signal. Such an audible signal is much more interesting and dramatic to the user than a mere graphical signal.

Having thus described in detail the particular form of my invention shown by way of example in the accompanying drawings, the principles exemplified thereby which I claim as new and desire to secure by Letters Patent I shall express in the following claims:

Claims:

1. An instrument of the class described designed to convey messages audibly comprising a base, a planchette swivelled thereon to oscillate under involuntary control of the hand, stop means limiting the movement of the planchette to a relatively short arc and cooperating with the planchette to give an audible signal whereby the normal operation of the instrument will afford a series of audible signals having an interpretable significance.

2. An instrument of the class described designed to convey messages audibly comprising a base, a planchette mounted thereon for a delimited movement of small amplitude under involuntary control of the hand and cooperating means to give audible signals at certain positions of the planchette within its normal operative range.

In testimony whereof, I have signed my name to this specification.

FRED S. CAMPBELL.